(12) United States Patent
Hirabe

(10) Patent No.: US 11,449,105 B2
(45) Date of Patent: Sep. 20, 2022

(54) DISPLAY APPARATUS THAT PREVENTS ERRONEOUS OPERATION OF TOUCH PANEL WHEN OPENING AND CLOSING OPENABLE BODY PROVIDED WITH DISPLAY DEVICE AND THE TOUCH PANEL, AND IMAGE FORMING APPARATUS

(71) Applicant: KYOCERA Document Solutions Inc., Osaka (JP)

(72) Inventor: Masato Hirabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 100 days.

(21) Appl. No.: 17/004,758

(22) Filed: Aug. 27, 2020

(65) Prior Publication Data
US 2021/0064093 A1   Mar. 4, 2021

(30) Foreign Application Priority Data
Sep. 4, 2019 (JP) .............................. JP2019-161550

(51) Int. Cl.
*G06F 1/16* (2006.01)
*G06F 11/34* (2006.01)
*G06F 3/041* (2006.01)

(52) U.S. Cl.
CPC .......... *G06F 1/1652* (2013.01); *G06F 1/1618* (2013.01); *G06F 1/1643* (2013.01); *G06F 1/1677* (2013.01); *G06F 3/04186* (2019.05); *G06F 11/3438* (2013.01)

(58) Field of Classification Search
CPC .. G06F 1/1652; G06F 3/04186; G06F 1/1618; G06F 1/1643; G06F 1/1677; G06F 11/3438
USPC ........................................................ 345/156
See application file for complete search history.

(56) References Cited

U.S. PATENT DOCUMENTS

| | | | | |
|---|---|---|---|---|
| 2012/0319943 A1* | 12/2012 | Tamura | ................. | G06F 3/1423 345/156 |
| 2013/0076598 A1* | 3/2013 | Sirpal | ................. | H05K 5/0017 345/1.3 |
| 2015/0015525 A1* | 1/2015 | Cho | ...................... | G06F 1/1647 345/173 |

FOREIGN PATENT DOCUMENTS

JP         2018-031884 A        3/2018

* cited by examiner

*Primary Examiner* — Amare Mengistu
*Assistant Examiner* — Gloryvid Figueroa-Gibson
(74) *Attorney, Agent, or Firm* — IP Business Solutions, LLC

(57) ABSTRACT

A display apparatus includes a controller that invalidates, while an open-close movement state is being detected by an open-close detection device, a touch operation made on a touch panel, and that validates the touch operation made on the touch panel, when either of an open state and a close state is being detected by the open-close detection device and when in a neutral state, the neutral state being where none of the open-close movement state, the open state, and the close state is being detected by the open-close detection device.

6 Claims, 7 Drawing Sheets

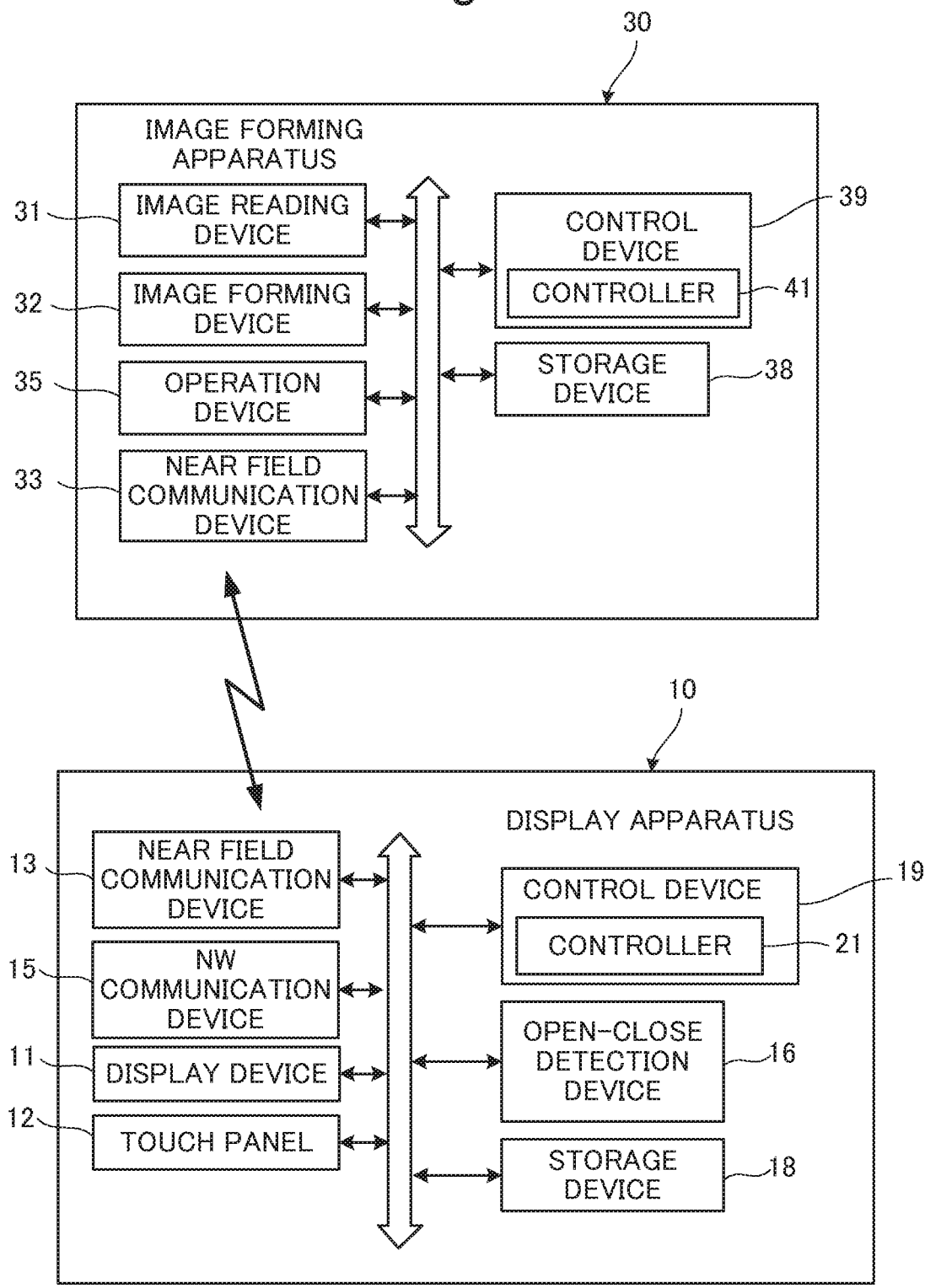

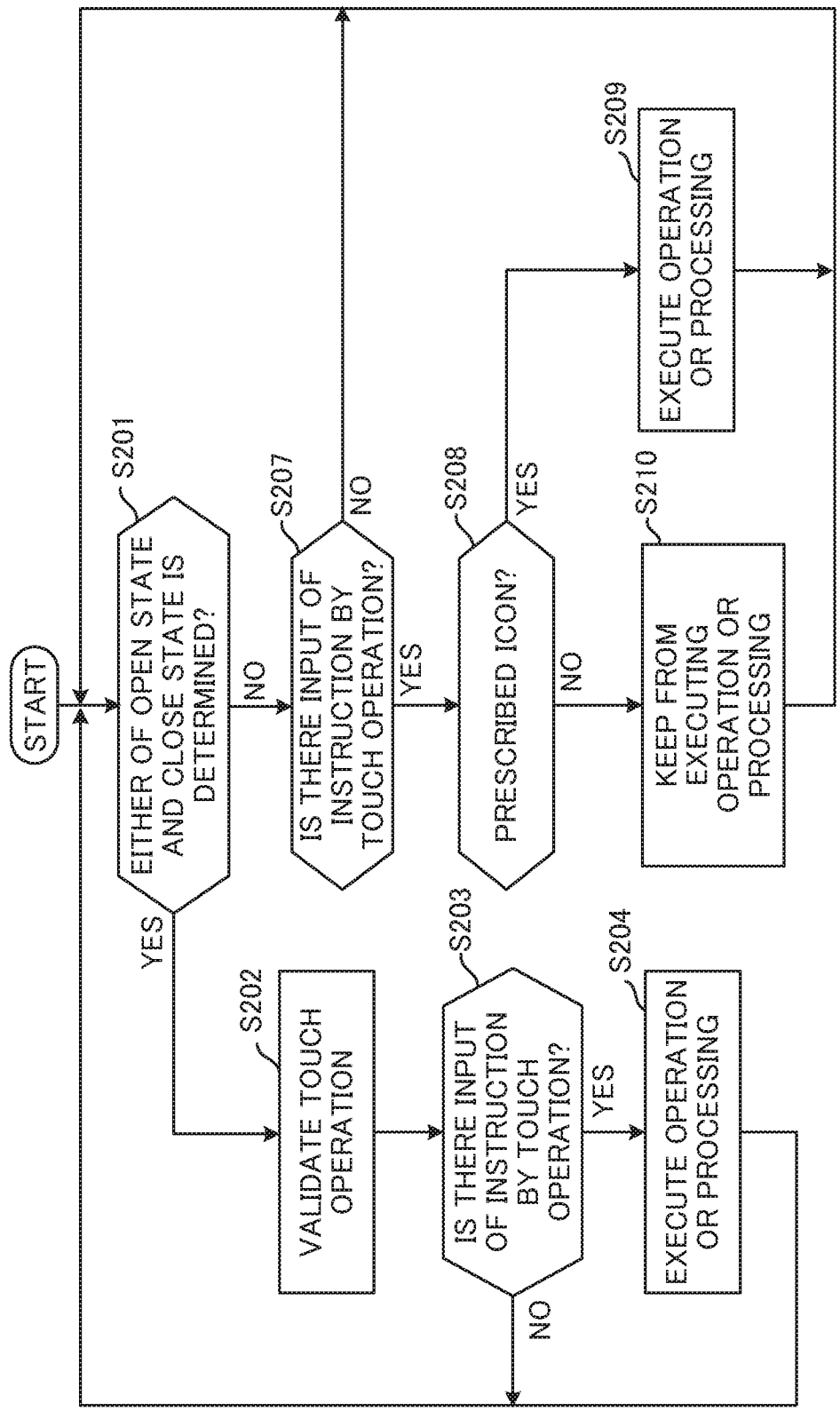

DISPLAY APPARATUS THAT PREVENTS ERRONEOUS OPERATION OF TOUCH PANEL WHEN OPENING AND CLOSING OPENABLE BODY PROVIDED WITH DISPLAY DEVICE AND THE TOUCH PANEL, AND IMAGE FORMING APPARATUS

INCORPORATION BY REFERENCE

This application claims priority to Japanese Patent Application No. 2019-161550 filed on Sep. 4, 2019, the entire contents of which are incorporated by reference herein.

BACKGROUND

The present disclosure relates to a foldable display apparatus provided with a display device and a touch panel, and an image forming apparatus including the display apparatus. Particularly, the disclosure relates to a technique of controlling display according to opening and closing of the display apparatus.

A display apparatus in general includes a display, and a touch panel disposed at a screen of the display. When an instruction is given on an icon or a button displayed on the screen of the display by being touched, a position of the touch is detected by the touch panel, and the icon or the button given the instruction is determined based on the position of the touch. In recent years, there is a display apparatus that the display apparatus itself is configured as foldable by imparting flexibility to both the display and the touch panel.

In a generally used information processing apparatus, a first and a second casing are provided, and the information processing apparatus is configured as foldable by a hinge (connecting portion) connecting the first casing with the second casing. If the angle between the first and the second casing is within a non-display angle range, a selection is made between the first and the second casing, and a display provided on the selected casing is caused to perform displaying.

SUMMARY

A technique improved over the above techniques is proposed herein as an aspect of the present disclosure.

A display apparatus according to an aspect of the present disclosure includes a display device, a touch panel, an openable body, an open-close detection device, and a control device. The display device is foldably flexible. The touch panel is disposed at a screen of the display device and is foldably flexible. The openable body supports the display device and the touch panel, and is openable and foldable along with the display device and the touch panel upon receiving an open-close operation. The open-close detection device detects an open state where the openable body is opened, a close state where the openable body is folded, and an open-close movement state where open-close movement continues until either one of the open state and the close state switches to another state. The control device includes a processor and, through the processor executing a control program, acts as a controller. The controller invalidates a touch operation made on the touch panel while the open-close movement state is being detected by the open-close detection device, and validates the touch operation made on the touch panel when either of the open state and the close state is being detected by the open-close detection device and when in a neutral state, the neutral state being where none of the open-close movement state, the open state, and the close state is being detected by the open-close detection device.

A display apparatus according to another aspect of the present disclosure includes a display device, a touch panel, an openable body, an open-close detection device, and a control device. The display device is foldably flexible. The touch panel is disposed at a screen of the display device and is foldably flexible. The openable body supports the display device and the touch panel, and is openable and foldable along with the display device and the touch panel upon receiving an open-close operation. The open-close detection device detects an open state where the openable body is opened, a close state where the openable body is folded, and an open-close movement state where open-close movement continues until either one of the open state and the close state switches to another state. The control device includes a processor and, through the processor executing a control program, acts as a controller. The controller invalidates a touch operation made on the touch panel while the open-close movement state is being detected by the open-close detection device and when in a neutral state, the neutral state being where none of the open-close movement state, the open state, and the close state is being detected by the open-close detection device, and validates the touch operation made on the touch panel when either of the open state and the close state is being detected by the open-close detection device.

An image forming apparatus according to still another aspect of the present disclosure includes the above-described display apparatus, and an image forming device that forms an image on a recording sheet.

BRIEF DESCRIPTION OF THE DRAWINGS

FIG. 1 is a block diagram showing an internal configuration of a display apparatus and an image forming apparatus according to an embodiment of the present disclosure.

FIG. 7 is a flowchart showing a third embodiment of control by the display apparatus.

DETAILED DESCRIPTION

Figure 2A:
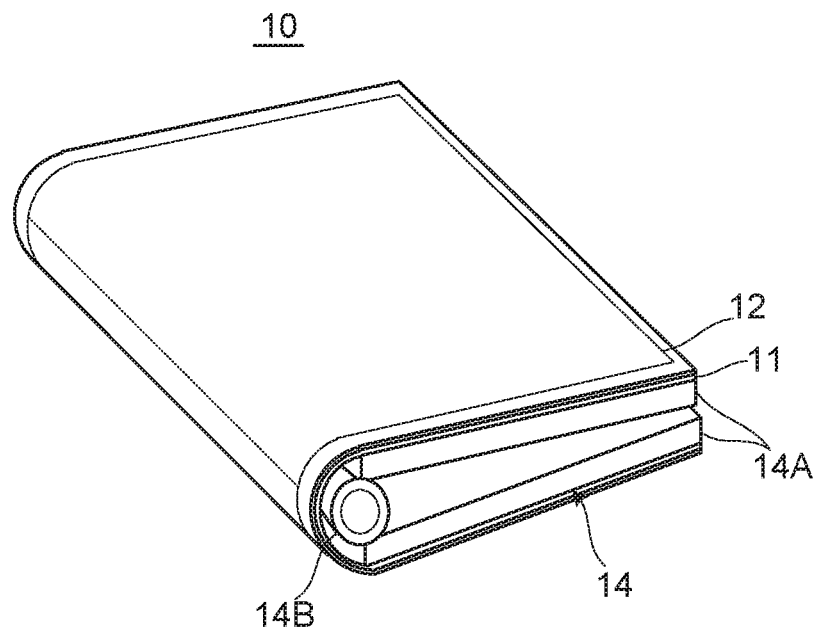
FIG. 2A is a perspective view showing a state where the display apparatus is folded in half.

Hereinafter, descriptions will be given of embodiments of the present disclosure with reference to the drawings.

FIG. 1 is a block diagram showing internal configurations of a display apparatus and an image forming apparatus according to one embodiment of the present disclosure.

The image forming apparatus 30 according to the present embodiment includes an image reading device 31, an image forming device 32, an operation device 35, a near field communication device 33, a storage device 38, and a control device 39. These components are configured to transmit and receive data or signal to and from each other via a bus.

The image reading device 31 has a scanner that optically reads a document placed on a contact glass, and generates image data representing an image of the document.

The image forming device 32 includes a photosensitive drum, a charging device uniformly charging a surface of the photosensitive drum, a exposure device exposing the surface of the photosensitive drum and forming an electrostatic latent image on the surface of the photosensitive drum, a developing device developing the electrostatic latent image formed on the surface of the photosensitive drum into a toner image, and a transfer device transferring the toner image (an image) formed on the surface of the photosensitive drum to a recording sheet, and forms the image represented by the image data on the recording sheet.

The near field communication device 33 is a communication device that performs data communication with the display apparatus 10 by a short-range communication based on Bluetooth (registered trademark) low energy (BLE).

The operation device 35 includes physical keys such as a numeric keypad, an enter key, and a start key.

The storage device 38 is a large-capacity storage device such as a solid state drive (SSD) and a hard disk drive (HDD), and contains various application programs and various types of data.

The control device 39 is formed of a processor, a random access memory (RAM), a read only memory (ROM), and so on. The processor is, for example, a central processing unit (CPU), an application specific integrated circuit (ASIC), or a micro processing unit (MPU). The control device 39 acts as a controller 41 through the processor executing a control program stored in the ROM or in the storage device 38.

The controller 41 controls the overall operation of the image forming apparatus 30. The control device 39 is connected to the image reading device 31, the image forming device 32, the near field communication device 33, the operation device 35, the storage device 38, and so on. The controller 41 controls operations of these components, and sends and receives signals or data to and from each of these components.

The controller 41 performs a role as a processing unit that executes various types of processing necessary for image formation by the image forming apparatus 30. Also, the controller 41 receives operational instructions inputted by a user through a press of a physical key of the operation device 35. Furthermore, the controller 41 controls communication operations of the near field communication device 33.

In the image forming apparatus 30 configured as above, when for example a user sets a document on the image reading device 31 and presses the start key of the operation device 35, the controller 41 causes the image reading device 31 to read an image of the document and causes the image forming device 32 to form the image on a recording sheet.

The display apparatus 10 is, for example, a smartphone and a mobile terminal device, and includes a display device 11, a touch panel 12, a near field communication device 13, a network communication device (NW communication device) 15, an open-close detection device 16, a storage device 18, and a control device 19. These components can send and receive data or signals to and from one another via a bus.

The display device 11 is a known display device, such as a liquid crystal display (LCD) or an organic light-emitting diode (OLED) display, and is foldably flexible.

The touch panel 12 is of a known touch panel and is foldably flexible. The touch panel 12 is disposed at a screen of the display device 11, and detects contact (touch) made on the touch panel 12 by, for example, a user's finger, as well as a position where the contact is made. Upon detecting the contact, the touch panel 12 receives an input of an instruction made to correspond to the contact position on the screen of the display device 11. The touch panel 12 serves as an operation device through which a user's instruction is inputted by an operation performed on the screen of the display device 11.

The near field communication device 13 is a communication device that performs data communication with the image forming apparatus 30 by a short-range communication based on Bluetooth (registered trademark) low energy.

The NW communication device 15 is a communication interface including a communication module such as a LAN chip (not shown). The NW communication device 15 is connected to an external terminal device via the LAN or the internet.

The storage device 18 is a storage device such as a RAM and a ROM, and stores various types of application programs, various pieces of information, and so on.

The control device 19 is formed of a processor, a RAM, a ROM, and so on. The processor is, for example, a CPU, an ASIC, or an MPU. The control device 19 acts as a controller 21 through the processor executing a control program stored in the ROM or in the storage device 18.

The control device 19 is connected to the display device 11, the touch panel 12, the near field communication device 13, the NW communication device 15, the open-close detection device 16, the storage device 18, and so on. The controller 21 controls operations of these components, and sends and receives signals or data to and from each of these components.

The controller 21 performs a role as a processing unit that executes various types of processing. Further, the controller 21 has a function for controlling a display operation of the display device 11, and a function for controlling communication operations of the near field communication device 13 and the NW communication device 15. Based on a detection output of the touch panel 12, the controller 21 determines a touch operation made on the screen of the display device 11 and detects a position on the screen of the display device 11 specified by the touch operation.

In the display apparatus 10 configured as above, when for example a user performs a one-tap operation, which is a touch operation performed once, on an icon on the screen of the display device 11, the controller 21 determines based on the detection output of the touch panel 12 a position of the one-tap operation, determines the icon being displayed on the position, and executes the processing having been associated in advance with the determined icon.

The display apparatus 10 performs data communication via the near field communication device 13 with the image forming apparatus 30. For example, the controller 21 reads out from the storage device 18 an application for a graphical user interface (GUI) for performing remote control of the image forming apparatus 30 and executes the application, causes the display device 11 to display the GUI on the screen, and detects through the touch panel 12 the touch operation made on the GUI. The controller 21 determines the instruction to the image forming apparatus 30 inputted from the user based on the touch operation, and sends the determined instruction to the image forming apparatus 30 through the near field communication device 13. In the image forming apparatus 30, the near field communication device 33 receives the instruction and the controller 41 controls the image forming apparatus 30 in accordance with the instruction.

As for a specific example, a printing instruction is sent with an image from the display apparatus 10 to the image forming apparatus 30, and in the image forming apparatus 30, under the control by the controller 41, the image is recorded on a recording sheet by the image forming device 32.

Figure 2B:
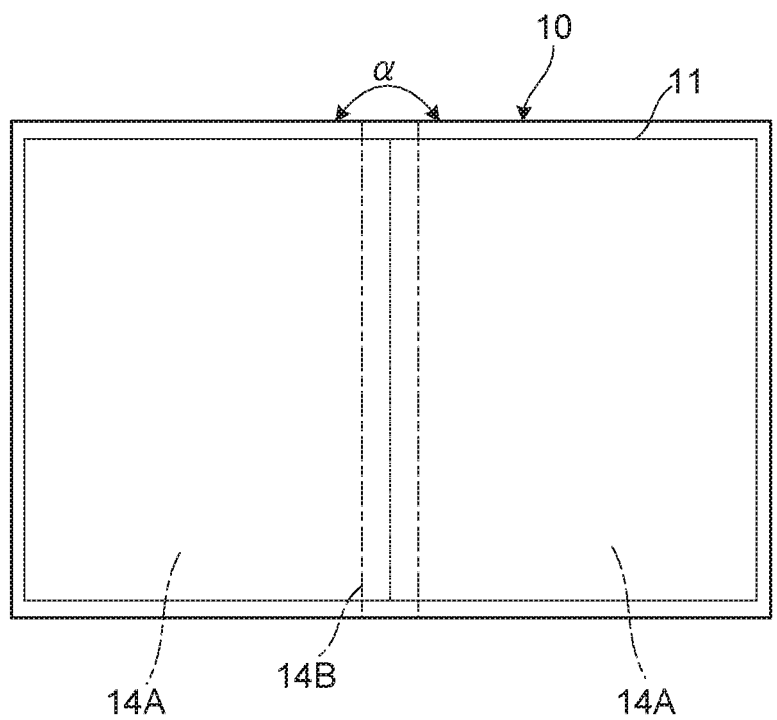
FIG. 2B is a plane view showing a state where the display apparatus is opened in a flat shape.

FIG. 2A is a perspective view showing a state where the display apparatus 10 is folded in half and FIG. 2B is a plane view showing a state where the display apparatus 10 is opened in a flat shape. As shown in FIG. 2A, the display apparatus 10 has an openable body 14 supporting the display device 11 and the touch panel 12. Upon receiving an open-close operation, the openable body 14 can be opened and folded along with the display device 11 and the touch panel 12. Hereinafter the openable body 14 will be described in detail. As shown in FIG. 2A and FIG. 2B, the openable body 14 that can be freely opened and closed is a mechanism having a hinge 14B and two thin casings 14A, the thin casings 14A being connected by the hinge 14B. The openable body 14 turns each of the thin casings 14A around the hinge 14B so as to open and close each of the thin casings 14A. Each of the thin casings 14A is internally equipped with the near field communication device 13, the NW communication device 15, the storage device 18, the control device 19, and so on. Furthermore, on almost all over an outer wall of each of the thin casings 14A, the display device 11 and the touch panel 12 are superposed and affixed.

Since both of the display device 11 and the touch panel 12 have flexibility as described above, with the opening and closing of each of the thin casings 14A, the display device 10 shifts into a close state where the display device 11 and the touch panel 12 are folded in half, an open state where the display device 11 and the touch panel 12 are opened to form a flat shape, an open-close movement state where open-close movement continues until either one of the open state and the close state switches to another state, and a state that is neither of these.

The open-close detection device 16 shown in FIG. 1 is, for example, a rotation angle sensor provided at the hinge 14B, detects open-close angle α of each of the thin casings 14A, and outputs the detected open-close angles α to the controller 21.

In the display apparatus 10, based on a detection output of the open-close detection device 16, the controller 21 determines which one of the close state, the open state, the open-close movement state, and a state that is neither of these, the display apparatus 10 is in.

Figure 3A:
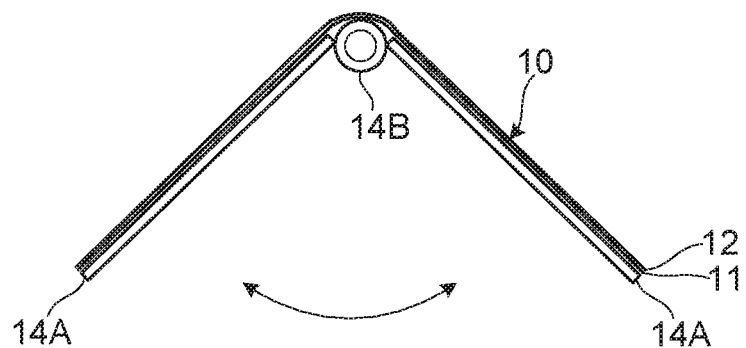
FIG. 3A is a diagram showing a state where a display device and a touch panel are in an open-close operation.
Figure 3B:
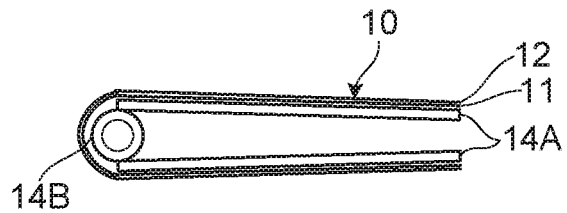
FIG. 3B is a diagram showing a state where the display device and the touch panel are closed.
Figure 3C:
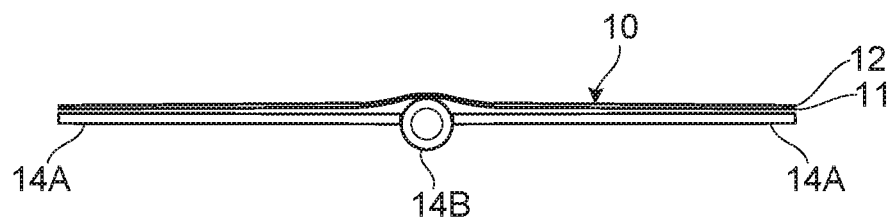
FIG. 3C is a diagram showing a state where the display device and the touch panel are opened.

Here, description will be given with reference to FIG. 3A to FIG. 3C. FIG. 3A is a diagram showing a state where the display device 11 and the touch panel 12 are in an open-close movement. FIG. 3B is a diagram showing a state where the display device 11 and the touch panel 12 are closed. FIG. 3C is a diagram showing a state where the display device 11 and the touch panel 12 are opened.

If a state in which the open-close angle α indicated by the detection output of the open-close detection device 16 fluctuates continues, the controller 21 determines that the display device 11 and the touch panel 12 (i.e., the openable body 14) are in the open-close movement state (FIG. 3A). If the open-close angle α indicated by the detection output of the open-close detection device 16 does not fluctuate (if it is constant), the controller 21 determines that the display device 11 and the touch panel 12 are not in the open-close movement state.

In other words, as shown in FIG. 3A, since the open-close angle α indicated by the detection output of the open-close detection device 16 fluctuates during an open-close movement of the display device 11 and the touch panel 12, the open-close movement state is determined by the controller 21. When the open-close movement of the display device 11 and the touch panel is interrupted and stopped in the middle, thereby a state where the open-close angle α is not fluctuating begins, it is determined by the controller 21 that the openable body 14 is not in the open-close movement state.

If the state in which the open-close angle α indicated by the detection output of the open-close detection device 16 fluctuates does not continue, the controller 21 compares the open-close angle α of each of the thin casings 14A with a first angle threshold D1 and a second angle threshold D2 (D1<D2) preset and stored. When the open-close angle α is smaller than the first angle threshold D1, the controller 21 determines that the display device 11 and the touch panel 12 are folded in half and the openable body 14 is in the close state (FIG. 3B).

Furthermore, if the state in which the open-close angle α indicated by the detection output of the open-close detection device 16 fluctuates does not continue and when the open-close angle α exceeds the second angle threshold D2, the controller 21 determines that the display device 11 and the touch panel 12 are opened in the flat shape and the openable body 14 is in the open state (FIG. 3C).

Figure 4A:
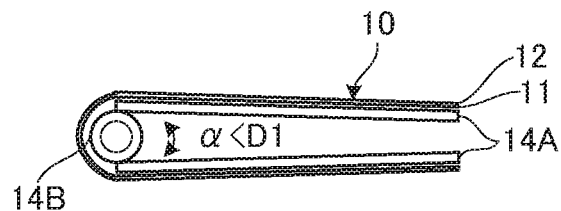
FIG. 4A is a diagram showing a state where the display apparatus and the touch panel are closed.
Figure 4B:
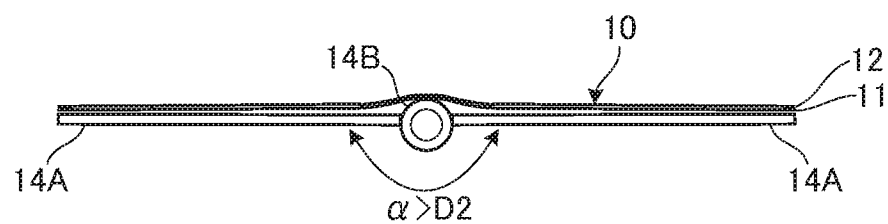
FIG. 4B is a diagram showing a state where the display apparatus and the touch panel are opened.

Therefore, in the following cases, the open-close movement state is determined by the controller 21: as shown in FIG. 4A, when the open-close angle α is smaller than the first angle threshold D1 and the close state of the display device 11 and the touch panel 12 is determined; as shown in FIG. 4B, when the open-close angle α exceeds the second angle threshold D2 and the open state of the display device 11 and the touch panel 12 is determined; and furthermore, when the state in which the open-close angle α indicated by the detection output of the open-close detection device 16 fluctuates continues.

The controller 21 invalidates the touch operation made on the touch panel 12 during a period while the open-close movement state is being detected by the open-close detection device 16. For example, the controller 21 invalidates the function of the touch panel 12, or does not execute the processing and operation based on the instruction inputted through the touch operation made on the touch panel 12 and sent from the touch panel 12. Thus, even when the user accidentally performs an unintended touch operation on the touch panel 12 when opening and closing the display device 10, since the instruction based on the unintended touch is not executed, an erroneous operation on the touch panel 12 can be prevented.

Figure 5:
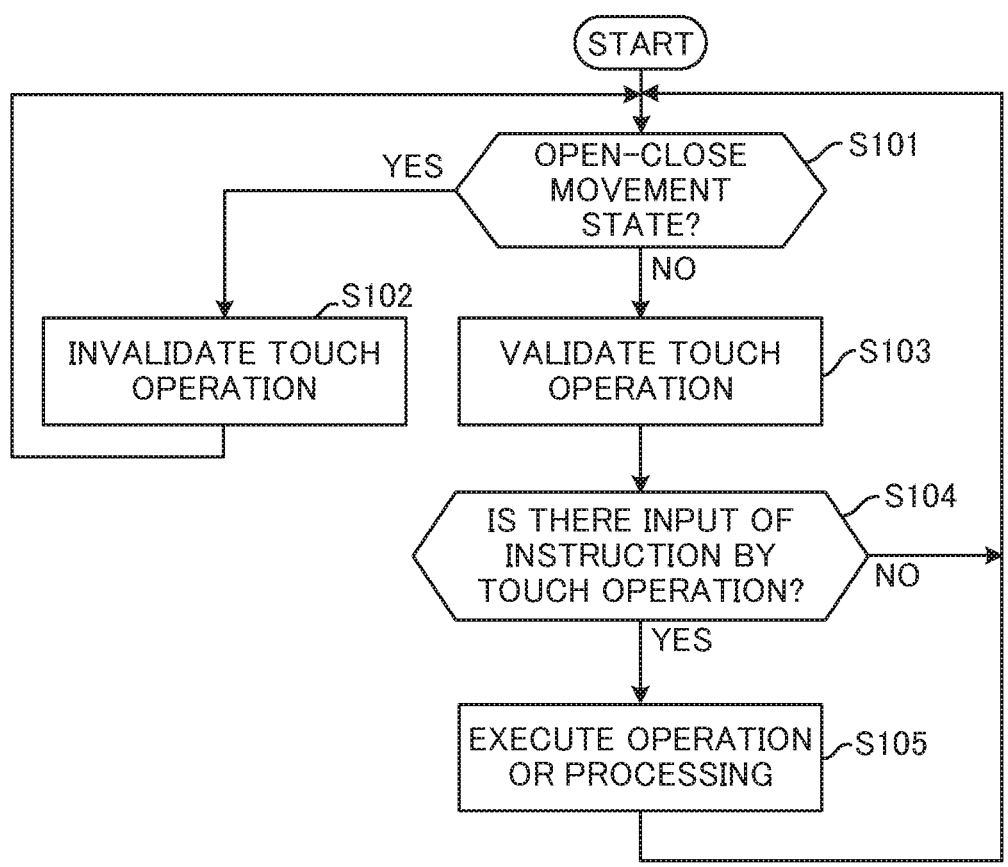
FIG. 5 is a flowchart showing a first embodiment of control by the display apparatus.

Next, description will be given of, with reference to a flowchart shown in FIG. 5, the first embodiment of the control by the display apparatus 10.

Firstly, based on the detection output of the open-close detection device 16, the controller 21 determines whether the display device 11 and the touch panel 12 are in the open-close movement state or not (S101).

For example, when an open-close operation being performed by a user on the display device 11 and the touch panel 12 is in the middle and when the controller 21 determines, based on the detection output of the open-close detection device 16, the display device 11 and the touch panel 12 are in the open-close movement state ("YES" at S101), the controller 21 invalidates the touch operation made on the touch panel 12 (S102). Thereafter, the operation returns to S101.

Also, when the controller 21 determines that, based on the detection output of the open-close detection device 16, the display device 11 and the touch panel 12 are not in the open-close movement state (NO at S101), that is, when either the open state or the close state is being detected by the open-close detection device 16, and also when in a neutral state, where neither the open-close movement state, the open state, nor the close state is detected by the open-close detection device 16, the controller 21 validates the touch operation made on the touch panel 12 (S103).

Figure 4C:
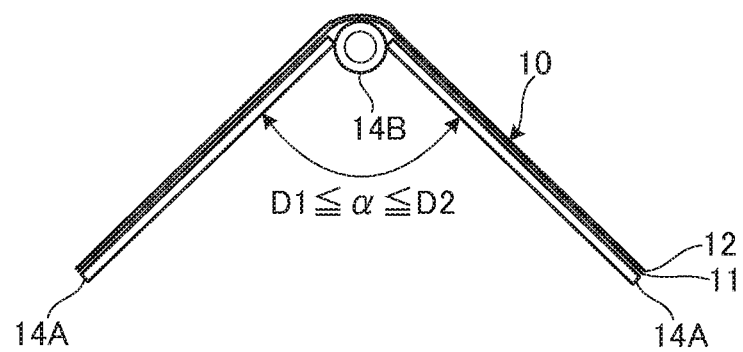
FIG. 4C is a diagram showing a state where the display apparatus and the touch panel are middle of an open-close operation.

In other words, in the following cases, the controller 21 validates the touch operation made on the touch panel 12: when either the open state or the close state is being detected by the open-close detection device 16; and also when in the neutral state where neither the open-close movement state, the open state, nor the close state is detected by the open-close detection device 16. For example, as shown in FIG. 4C, when the movement of the openable body 14 is stopped in the process of shifting from one of the open state and the close state to the other, the neutral state is determined.

Then, based on the detection output of the touch panel 12, while determining if there is a touch operation or not, the controller 21 waits for an input of an instruction by a touch operation (S104). When the touch operation is not made on the touch panel 12 and the controller 21 determines that no instruction is outputted from the touch panel 12 (NO at S104), the operation returns to S101.

When there is a touch operation by the user made on any icon displayed on the screen of the display device 11 and the controller 21 determines that the instruction is outputted from the touch panel 12 (YES at S104), the controller 21 executes the operation or the processing that is based on this instruction (S105). Thereafter, the operation returns to S101.

As described thus far, when an open-close operation being performed by the user on the display device 11 and the touch panel 12 is in the middle, the touch operation made on the touch panel 12 is invalidated, and the operation or the processing that is based on the instruction inputted into the touch panel 12 is not executed. Thus, even when the user accidentally performs an unintended touch operation on the touch panel 12, an erroneous operation based on the unintended touch can be prevented.

Opening and closing of the foldable display apparatus referred to in the above BACKGROUND section is manually performed by a user, so that the user sometimes accidentally unintentionally touch the touch panel of the display apparatus when opening and closing the display apparatus. Therefore, an erroneous operation is likely to occur. In the generally used information processing apparatus mentioned in the BACKGROUND section, if the angle between the first and second casing is within the non-display angle range, the displaying is caused to be performed by the display that is provided on the casing selected from the first and second casing. This is a technique related to displaying, and the technique cannot prevent in advance the erroneous operation described above.

On the other hand, in the present embodiment, it is possible to prevent an erroneous operation that occurs on the touch panel of the display apparatus when the display apparatus is opened.

Next, description will be given of the second embodiment of the control by the display apparatus 10.

In the second embodiment, the controller 21 invalidates the touch operation made on the touch panel 12 when determining that the display device 11 and the touch panel 12 are in either of the open-close movement state and the neutral state. When determining that the display device 11 and the touch panel 12 are in the close state or in the open state, the controller 21 validates the touch operation made on the touch panel 12, and determines, based on the detection output of the touch panel 12, the icon that received the touch operation, and executes the processing of the determined icon. This makes it is possible to prevent in advance an erroneous operation on the touch panel 12 that occurs in the middle of the open-close operation of the display device 11 and the touch panel 12.

Figure 6:
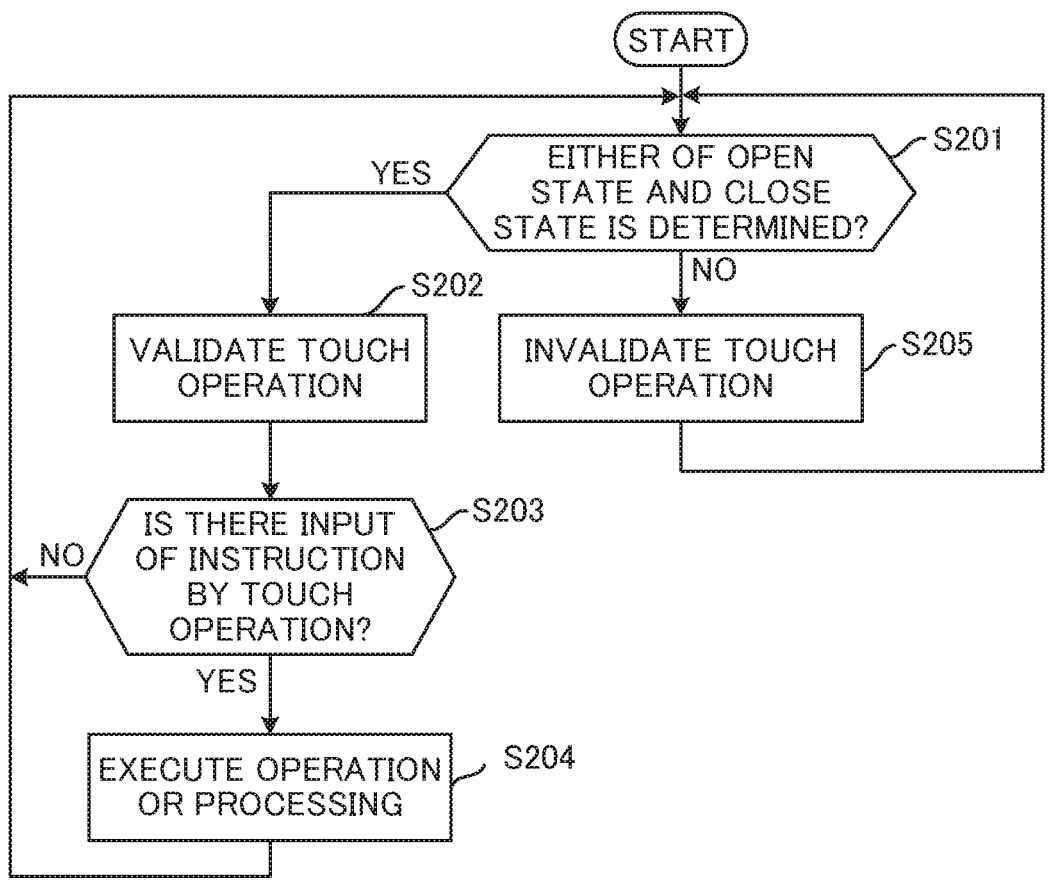
FIG. 6 is a flowchart showing a second embodiment of control by the display apparatus.

Description will be given of the second embodiment of the control by the display apparatus 10 with reference to a flowchart shown in FIG. 6. The description of the same processing as the first embodiment is omitted.

At first, when either of the open state and the close state is determined (YES at S201), the controller 21 validates the touch operation made on the touch panel 12 (S202). Under this state, based on the detection output of the touch panel 12, while determining if there is a touch operation or not, the controller 21 waits for an input of an instruction by a touch operation (S203).

Then, when the touch operation is not made on the touch panel 12, that is, when the controller 21 determines that no instruction is outputted from the touch panel 12 (NO at S203), the operation returns to S201. When there is a touch operation by the user made on any of the icons displayed on the screen of the display device 11 and the controller 21 determines that the instruction is outputted from the touch panel 12 (YES at S203), the controller 21 executes the operation or the processing that is based on this instruction (S204). Thereafter, the operation returns to S201.

Therefore, as long as the open state or the close state is continuously maintained (YES at S201), the steps S202 to S204 are repeated.

In contrast, either of the open-close movement state and the neutral state is determined (NO at S201), the controller 21 invalidates the touch operation made on the touch panel 12 (S205). Thereafter, the operation returns to S201.

According to the second embodiment, while a user is performing an open-close operation on the display device 11 and the touch panel 12 and when the user stops an open-close operation with the openable body 14 in an intermediate position between the open state and the close state, the touch operation made on the touch panel 12 is invalidated, and the operation or the processing that is based on the instruction inputted into the touch panel 12 is not executed. Thus, even when the user accidentally performs an unintended touch operation on the touch panel 12, an erroneous operation based on the unintended touch can be prevented.

Hereinafter, description will be given of the third embodiment of the control by the display apparatus 10. FIG. 7 is a flowchart showing the third embodiment of the control by the display apparatus 10. The description of the same processing as the first and second embodiments is omitted.

In the third embodiment, either of the open-close movement state and the neutral state is determined (NO at S201), based on the detection output of the touch panel 12, while determining if there is a touch operation or not, the controller 21 waits for an input of an instruction by a touch operation (S207).

When the touch operation is not made on the touch panel 12 and the controller 21 determines that no instruction is outputted from the touch panel 12 (NO at S207), the operation returns to S201.

When there is a touch operation by the user made on any of the icons displayed on the screen of the display device 11 and the controller 21 determines that the instruction is outputted from the touch panel 12 (YES at S207), the controller 21 determines whether the instruction is an instruction made to correspond to a prescribed icon (the instruction inputted through the operation on the prescribed icon) or not (S208). The prescribed icon is the icon selected in advance by an operation by the user performed on the touch panel 12 serving as the operation device and having been accepted by the controller 21.

When determining that the instruction is the one made to correspond to the prescribed icon (YES at S208), the controller 21 executes the operation or the processing that is based on the instruction (S209). Thereafter, the operation returns to S201.

When determining that the instruction is not the one made to correspond to the prescribed icon (NO at S208), the controller 21 keeps from executing the operation or the processing that is based on the instruction (S210). Thereafter, the operation returns to S201.

In contrast, when either of the open state and the close state is determined (YES at S201), based on the detection output of the touch panel 12, while determining if there is a touch operation or not, the controller 21 waits for an input of an instruction by a touch operation (S203). When the touch operation is not made on the touch panel 12 and the controller 21 determines that no instruction is outputted from the touch panel 12 (NO at S203), the operation returns to S201.

When there is a touch operation by the user made on any of the icons displayed on the screen of the display device 11 and the controller 21 determines that the instruction is outputted from the touch panel 12 (YES at S203), the controller 21 executes the operation or the processing that is based on this instruction (S204) without determining whether the instruction is the one made to correspond to the prescribed icon or not. Thereafter, the operation returns to S201.

As described thus far, in the third embodiment, even if the display apparatus 10 is in either of the open-close movement state and the neutral state, the operation or the processing that is based on the instruction inputted by the touch operation made on the prescribed icon is executed. This enhances convenience in operating the prescribed icon.

In the third embodiment, when the prescribed icon is set as a frequently used icon, and the instruction is the one made to correspond to the frequently used icon, it may be configured that even if the display apparatus 10 is in either of the open-close movement state and the neutral state, the operation or the processing that is based on the instruction inputted by the touch operation made on the frequently used icon is executed. In such case, the controller 21 detects frequency of use at any time for each of the icons, and determines, when an icon is operated, whether the frequency of use is a preset threshold value or over. When the frequency of use is the preset threshold value or over, the controller 21 validates the touch operation made on the icon. To be more specific, the controller 21 detects the frequency of use for each of the icons displayed on the screen of the display device 11. When one of the icons is operated, the controller 21 determines whether the frequency of use of the one icon is the preset threshold value or over, and: (i) when the frequency of use is the preset threshold value or over, sets the icon whose frequency of use is high as the prescribed icon, and validates the touch operation made on the prescribed icon; and (ii) when the frequency of use is less than the preset threshold value, invalidates the touch operation made on the icon whose frequency of use is less than the preset threshold value.

Furthermore, in the first to the third embodiments, it may be configured that when a preset type of touch operation is made on an icon, the touch operation made on the icon is validated even in the middle of the open-close operation of the display device 11 and the touch panel 12. For example, when the display apparatus 10 is in either of the open-close movement state and the neutral state, upon detecting, through the touch panel 12, a flick operation made (preset type of touch operation) on an icon, the controller 21 may be configured to execute the operation or the processing that is based on the instruction inputted by the flick operation made on the icon.

In any of the first to the third embodiments, in the display apparatus 10, an icon is displayed on the screen of the display device 11. However, a GUI for performing remote control of the image forming apparatus 30 may be displayed on the screen of the display device 11. In such case, the controller 21 may be configured to determine an instruction to the image forming apparatus 30, the instruction being inputted by the user based on the touch operation made on this GUI, and causes the near field communication device 13 to send the instruction determined to the image forming apparatus 30. In the image forming apparatus 30, the instruction is received by the near field communication device 33, and the controller 41 controls the image forming apparatus 30 in accordance with the instruction. Also in this case, when an open-close movement being performed by the user on the display device 11 and the touch panel 12 is in the middle of the operation, the controller 21 invalidates the touch operation on the touch panel 12, and when the open-close movement being performed by the user on the display device 11 and the touch panel 12 is not in the middle of the operation, the controller 21 validates the touch operation made on the touch panel 12.

In each of the foregoing embodiments, in the display apparatus 10, the target that the controller 21 causes the display device 11 to display is icons. Instead of the icons or together with the icons, however, buttons may be the target of the display, and the display control described above may be performed like the case where the icons are the target of the display.

The image forming apparatus 30 may be formed as including the display apparatus 10. Furthermore, an image forming system including the display apparatus 10 and the image forming apparatus 30 may be used.

The configurations according to the foregoing embodiments described with reference to FIG. 1 to FIG. 7 are merely exemplary, and in no way intended to limit the disclosure to those configurations and arrangements.

While the present disclosure has been described in detail with reference to the embodiments thereof, it would be apparent to those skilled in the art the various changes and modifications may be made therein within the scope defined by the appended claims.

What is claimed is:
1. A display apparatus comprising:
a display device that is foldably flexible;
a touch panel that is disposed at a screen of the display device and is foldably flexible;

an openable body that supports the display device and the touch panel, and is openable and foldable along with the display device and the touch panel upon receiving an open-close operation;

an open-close detection device that detects an open state where the openable body is opened, a close state where the openable body is folded, and an open-close movement state where open-close movement continues until either one of the open state and the close state switches to another state; and a control device that includes a processor and, through the processor executing a control program, acts as a controller that validates all touch operations made on the touch panel when either of the open state and the close state is being detected by the open-close detection device, wherein, when the controller detects a touch operation for a prescribed icon or a prescribed button determined in advance through the touch panel in either of the open-close movement state and a neutral state, the neutral state being where none of the open-close movement state, the open state and the close state is being detected by the open-close detection device, the controller validates the touch operation and, when the controller detects a touch operation on an icon or a button other than the prescribed icon and the prescribed button through the touch panel in either of the open-close movement state and the neutral state, the controller invalidates the touch operation.

2. The display apparatus according to claim 1, wherein the controller sets an icon or a button chosen in advance by a user as the prescribed icon or the prescribed button.

3. The display apparatus according to claim 1, wherein the controller sets an icon or a button whose frequency of use is high as the prescribed icon or the prescribed button.

4. The display apparatus according to claim 3, wherein the controller detects frequency of use for each of a plurality of icons or a plurality of buttons that are displayed on the screen of the display device, and determines, when one of the icons or the buttons is operated, whether the frequency of use of the one icon or the one button is a preset threshold value or over, and the controller:

(i) when the frequency of use is the preset threshold value or over, sets an icon or a button whose frequency of use is high as the prescribed icon or the prescribed button; and (ii) when the frequency of use is less than the preset threshold value, does not set an icon or a button whose use frequency is less than the preset threshold value.

5. A display apparatus comprising:
a display device that is foldably flexible;
a touch panel that is disposed at a screen of the display device and is foldably flexible;
an openable body that supports the display device and the touch panel, and is openable and foldable along with the display device and the touch panel upon receiving an open-close operation;
an open-close detection device that detects an open state where the openable body is opened, a close state where the openable body is folded, and an open-close movement state where open-close movement continues until either one of the open state and the close state switches to another state; and
a control device that includes a processor and, through the processor executing a control program, acts as a controller that validates all touch operations made on the touch panel when either of the open state and the close state is being detected by the open-close detection device,
wherein, when the controller detects, through the touch panel, a preset type of touch operation on an icon or a button displayed on the screen of the display device in either of the open-close movement state and a neutral state, the neutral state being where none of the open-close movement state, the open state and the close state is being detected by the open-close detection device, the controller validates the touch operation and, when the controller detects a touch operation, which is other than the preset type of touch operation, on the icon or the button through the touch panel in either of the open-close movement state and the neutral state, the controller invalidates the touch operation.

6. An image forming apparatus comprising:
the display apparatus according to claim 5; and
an image forming device that forms an image on a recording sheet.

* * * * *